US008243734B1

(12) United States Patent
Deters et al.

(10) Patent No.: US 8,243,734 B1
(45) Date of Patent: Aug. 14, 2012

(54) SYSTEM AND METHOD FOR PROVIDING DETERMINISTIC ROUTING IN A NETWORK ENVIRONMENT

(75) Inventors: Vincent L. Deters, Wake Forest, NC (US); Michael Wright, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 260 days.

(21) Appl. No.: 12/548,167

(22) Filed: Aug. 26, 2009

(51) Int. Cl.
*H04L 12/28* (2006.01)
(52) U.S. Cl. .................. 370/392; 370/401; 709/228
(58) Field of Classification Search .................. 370/389, 370/392
See application file for complete search history.

(56) References Cited

U.S. PATENT DOCUMENTS

| | | | | |
|---|---|---|---|---|
| 2002/0093981 A1* | 7/2002 | Turina et al. | ................ | 370/467 |
| 2002/0165807 A1* | 11/2002 | Tadano et al. | ................ | 705/32 |
| 2008/0240086 A1* | 10/2008 | Bouckaert et al. | ............ | 370/352 |
| 2009/0168761 A1* | 7/2009 | Ohnishi | ................ | 370/352 |
| 2011/0106974 A1* | 5/2011 | Brabson | ................ | 709/238 |
| 2011/0110221 A1* | 5/2011 | Hlibiciuc et al. | ............ | 370/217 |

OTHER PUBLICATIONS

J. Loughney et al., "Signalling Connection Control Part User Adaptation Layer (SUA)," Network Working Group, RFC 3868; ftp://ftp.isi.edu/in-notes/rfc3868.txt; 123 pages.
K. Morneault, et al., "Signaling System 7 (SS7) Message Transfer Part 3 (MTP3)—User Adaptation Layer (M3UA)," Network Working Group, RFC 4666; ftp://ftp.isi.edu/in-notes/rfc4666.txt; 116 pages.

* cited by examiner

*Primary Examiner* — Jung Park
(74) *Attorney, Agent, or Firm* — Patent Capital Group

(57) ABSTRACT

A method is provided in one example embodiment and includes receiving a packet that is part of a flow, and identifying parameters within the packet for mapping the packet to a selected endpoint amongst a plurality of endpoints. The method further includes generating a first binding table that reflects the packet being associated with the selected endpoint, and identifying that the selected endpoint has changed state. An update message is communicated to a peer network element, the update message directing the peer network element to rebuild a peer binding table to reflect the changed state. In more specific embodiments, the binding tables include matching entries for the selected endpoint and the flow. One of the parameters can be a Signaling System Number 7 (SS7) parameter within the packet.

17 Claims, 3 Drawing Sheets

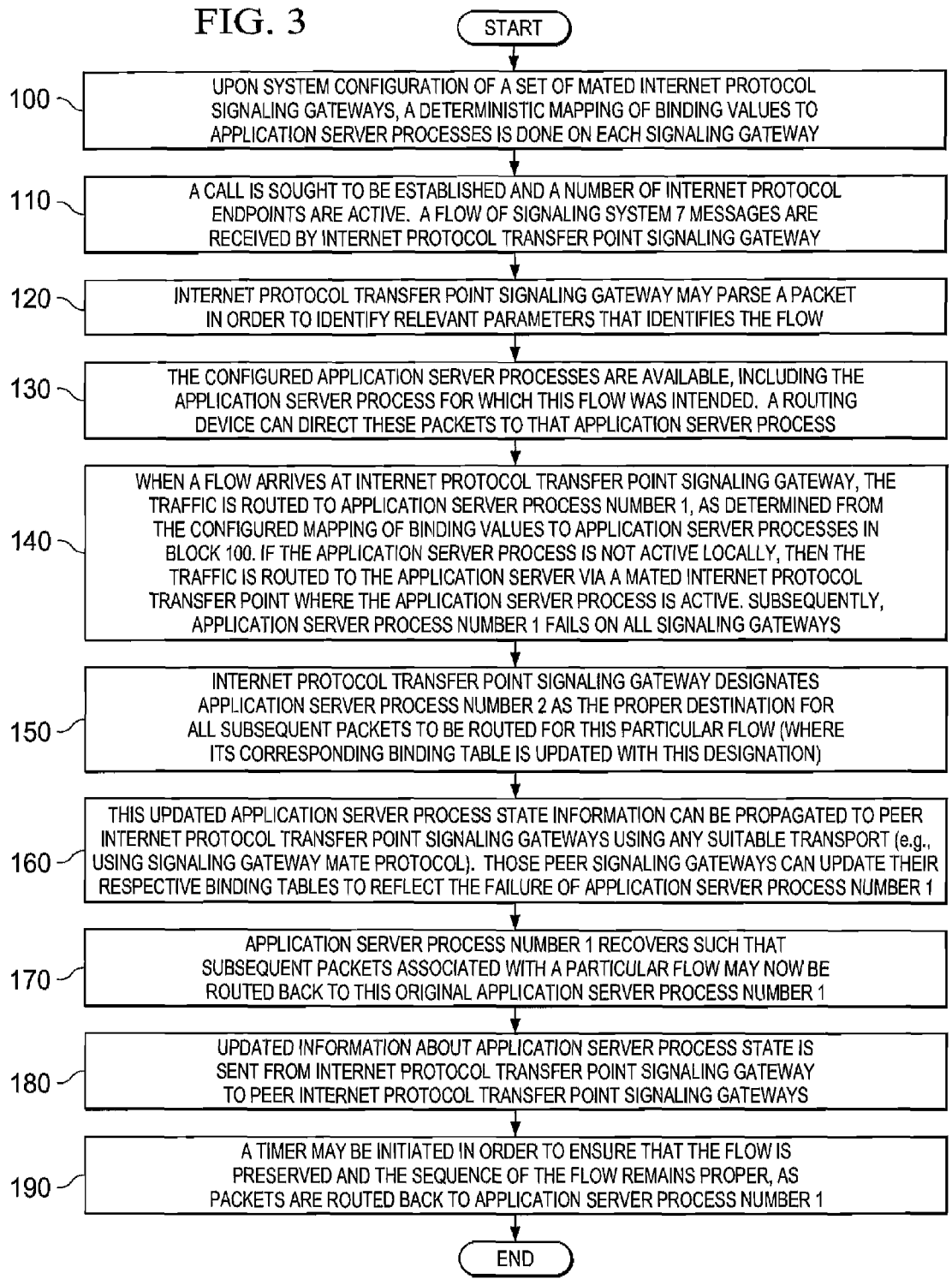

SYSTEM AND METHOD FOR PROVIDING DETERMINISTIC ROUTING IN A NETWORK ENVIRONMENT

TECHNICAL FIELD

This disclosure relates in general to the field of communications and, more particularly, to providing deterministic routing in a network environment.

BACKGROUND

The field of communications has become increasingly important in today's society. In particular, the ability to quickly and effectively establish call flows presents a significant obstacle for component manufacturers, system designers, and network operators. This obstacle is made even more difficult due to the plethora of diverse and emerging communication technologies that exist in the marketplace. As new communication platforms become available to the consumer, new protocols should be developed in order to optimize this emerging technology. Some issues have arisen in call network scenarios in which signaling overhead has become either burdensome, or ineffective when failures occur in the network.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 3 is a simplified flowchart illustrating a series of example steps associated with the communication system.

DETAILED DESCRIPTION OF EXAMPLE EMBODIMENTS

Overview

A method is provided in one example embodiment and includes receiving a packet that is part of a flow, and identifying parameters within the packet for mapping the packet to a selected endpoint amongst a plurality of endpoints. The method further includes generating a first binding table that reflects the packet being associated with the selected endpoint, and identifying that the selected endpoint has changed state. An update message is communicated to a peer network element, the update message directing the peer network element to rebuild a peer binding table to reflect the changed state. In more specific embodiments, the binding tables include matching entries associating the selected endpoint and the flow. One of the parameters can be a Signaling System Number 7 (SS7) parameter within the packet, and the association of the packet to the selected endpoint can be an application server process (ASP) binding provided in the first binding table. The first binding table can include an Internet Protocol (IP) address associated with each of the endpoints, a port number, and a flow number assigned to the flow. The update message can be provided in a signaling gateway mate protocol (SGMP), and one of the parameters indicates an application server to which the packet is to be directed.

Example Embodiments

Figure 1:
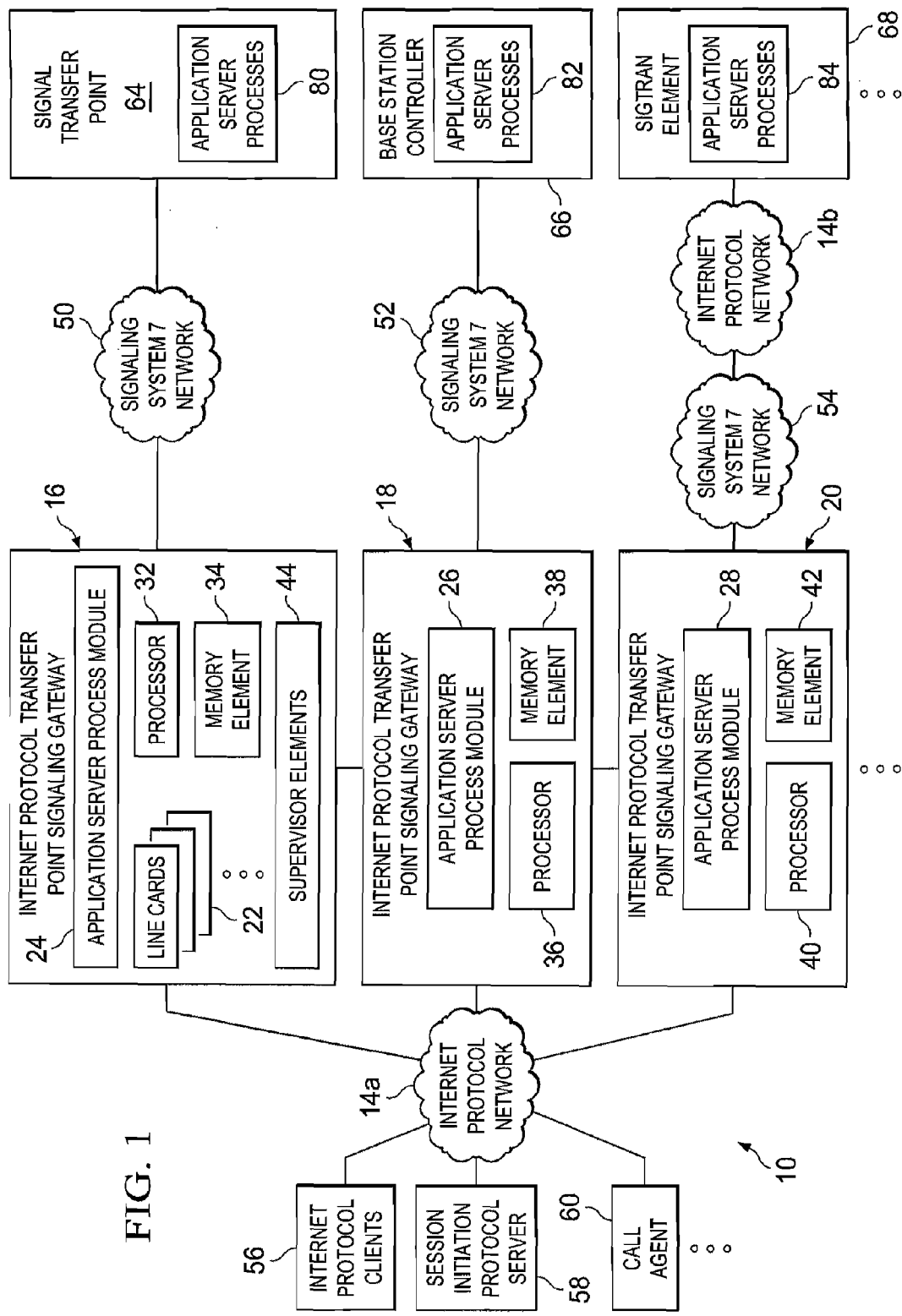
FIG. 1 is a simplified block diagram of a communication system for providing deterministic routing in a network environment in accordance with one embodiment.

FIG. 1 is a simplified block diagram of a communication system 10 for providing deterministic routing in a network environment. FIG. 1 may include a set of Internet Protocol (IP) networks 14a and 14b, a set of IP transfer point (ITP) signaling gateways 16, 18, and 20: each of which may include a respective processor (32, 36, 40) and a respective memory element (34, 38, 42). Additionally, each gateway may include an application server process (ASP) module 24, 26, and 28 respectively. The distributed architecture of ITP signaling gateway 16 further includes one or more line cards 22, and one or more supervisor elements 44 in a distributed platform model.

FIG. 1 may also include one or more IP clients 56, a session initiation protocol (SIP) server 58, and a call agent 60. These endpoints are configured to couple to IP network 14a and, further, can be any device associated with call control (e.g., representing the instantiation of call control for voice). These IP clients generally include some type of database, which can be implicated in the context of a call set up (for example, in a Signaling System Number 7 (SS7) network). Part of this call control network may involve one or more IP based servers. FIG. 1 may further include a number of connections to various components that seek to obtain a call connection (e.g., through IP network 14b). These could include a number of legacy mechanisms (e.g., base station controllers (BSCs), mobile switching centers (MSCs), radio access network (RAN) access devices, etc.). In this particular example of FIG. 1, these include a signal transfer point (STP) 64, a BSC 66, and a SIGTRAN element 68. In a 3 G network (i.e., an IP network), a signaling gateway can operate as a flow manager, where the transport is SIGTRAN over IP. Note that each of these elements can include a respective ASP processes element 80, 82, and 84. Communication system 10 can be configured to ensure that flows are processed by the same ASP process, as detailed below.

Note that before turning to the example flows and infrastructure of example embodiments of the present disclosure, a brief overview of the call network architecture is provided. SS7 offers a set of telephony signaling protocols that are used to set up public switched telephone network telephone calls. The main purpose of the network is to set up, manage, and tear down calls. Other uses of SS7 include number translation, a prepaid billing mechanism, short message service (SMS), and a variety of other market services. The network can be made up of several link types and three signaling nodes: service switching points (SSPs), signal transfer points (STPs), and service control points (SCPs). Extended services can be provided by a database interface at the SCP level using the SS7 network.

An application server process (ASP) can be a signaling gateway's component, process, or database, for example, involving call agents, home location registers (HLRs), etc. An ITP instance can terminate SS7 links, translate the distributive message transfer part level 3 (MTP3) messages into distributed MTP3 user adaptation (M3UA) (or SCCP user adaptation (SUA) messages), and transport them to a SIGTRAN-ready gateway over a stream control transport protocol (SCTP)/IP. In addition, the ITP instance can maintain an application server state machine, which provides the routing context via a specific set of routing keys. These routing keys can be used to examine signaling traffic and to make routing decisions. The ITP signaling gateway (e.g., as part of an application server) can support one or many ASPs. An ASP can be defined as an SCTP endpoint of the packet gateway. The ASP can be a process instance of an application server: either an active, an inactive, a congested, or a standby process. The ASP can also be viewed as a SIGTRAN object for identifying a process or database from which the signaling gateway can send and receive M3UA (or SUA) traffic.

When transporting a SS7 signaling payload (e.g., signaling connection control part (SCCP) messages) over an IP network to a group of endpoints sharing a common point code, there is a desire to map certain flows identified by message-specific parameters (such as circuit identification code (CIC), transaction identifier (TID), or signaling link selection (SLS) code) to specific IP endpoints. This can be done in order to maintain ordering and to ensure that multi-part messages are processed by the same endpoint. In order to function properly, a number of operations should be performed. For example, the mapping should be performed algorithmically to prevent the need to maintain explicit discrete mapping entities. This could be used to handle large parameter ranges such as a 16K CIC range. In addition, a mapping algorithm should be deterministic in order to enable multiple routing nodes serving the same group of endpoints to use the same mapping, without explicitly exchanging mapping values. Again, such a mapping exchange can be impractical due to the potentially large range of mapped values. Also, individual IP endpoints in a common group served by multiple routing nodes may change their availability to any node at any time. This means that the mapping algorithm should be independent of transient availability fluctuations such that the mapping to any static subgroup of available endpoints does not depend on the composition of a prior subgroup of available endpoints.

Another consideration is that when an IP endpoint becomes unavailable, flows mapped to it should be redistributed to remaining available endpoints without affecting other existing mappings. Optimal load-balancing of discrete flows across the group of available IP endpoints should be maintained as individual endpoints change availability. Load-balancing may be subject to discrete weighting of individual endpoints, including specifying any subgroup of endpoints to be used when no other endpoints are available (i.e., a backup set).

In regards to ASP bindings more specifically, once a flow is initiated, it is important that the rest of the flow continue across the same route and equipment. To help ensure this process, ITP signaling gateway 16 uses ASP bindings, which manage the signaling traffic and, further, direct any associated management messages to follow a set pathway. In addition to maintaining local ASP bindings, a manager mechanism (e.g., ITP signaling gateway 16) can maintain the state of the alternate's ASP bindings.

Additionally, example embodiments presented herein can employ ASP module 24 to offer an effective deterministic routing operation in a loadsharing environment. In one example implementation, an SS7 parameter can be used to identify the bindings; however, the present disclosure is not limited solely to SS7 applications. For example, any parameter that could be extracted from a packet can be used to identify an appropriate binding for efficiently routing information.

In more specific instances, and for a contiguous range of input parameters and a group of IP endpoints where local and remote availability is known, each discrete parameter value can be mapped to a specific endpoint in proportions dictated by static weights individually assigned to each endpoint. This is independent of the prior availability of an endpoint, and this approach minimizes disruption of mappings to endpoints that do not change availability. The mechanism can deterministically load-balance messages received by multiple routers towards a pool of weighted IP endpoints of independently varying availability, while mapping specific message flows to specific available endpoints in a one-to-one fashion.

In addition, these deterministic load-balancing mappings can offer a comprehensive solution that includes a number of important features. One implementation involves weighted load-balancing. For example, each time an ITP signaling gateway executes a decision about a new flow or redistributed flow (e.g., the client became unavailable), it can employ a configured weight of the client. Another feature relates to weight-zero (weight=0) endpoints (e.g., a backup set). This is a special condition in which, if no other clients are available, a weight=0 type of client can be sent data. Another feature may include an optimization for minimally disruptive redistribution (due to endpoint availability changes). Also, such an approach may offer real-time synchronizing of endpoint availability to enable load-balancing through a mated pair of network elements (e.g., using signaling gateway mate protocol (SGMP)). The distribution mechanism of ASP module 24 accounts for the possibility that clients may become inactive on multiple gateways (or servers) and, further, this may be detected by the gateways at different times. The term 'active' as used herein in this Specification refers to an ability (or a willingness) to process or otherwise receive packets associated with flows (i.e., any type of messaging in the network). Similarly, the term 'inactive' refers to an indication of an inability or an unwillingness to process or otherwise receive packets associated with flows.

The order of clients becoming active or inactive (within small windows) may vary slightly. However, even in that case, the distribution mechanism outlined herein has no dependency on any former state of client availability. Once these windows of ambiguity have ended, the order in which these clients became unavailable or available will not matter. Note that providing the same set of (consistent) client availabilities on each server allows the distribution to remain the same. Note that as used herein in this Specification, the term 'state' is meant to connote any transition related to being active, inactive, congested, not congested, failure etc. Any such changes (as well as other changes) could trigger adjustments to the ASP selection mechanism, as discussed herein.

Turning to the infrastructure of FIG. 1, networks 14a-b represent a series of points or nodes of interconnected communication paths for receiving and transmitting packets of information, which propagate through communication system 10. Networks 14a-b offer a communicative interface between servers (and/or endpoints) and may be any local area network (LAN), a wireless LAN (WLAN), a metropolitan area network (MAN), a virtual LAN (VLAN), a virtual private network (VPN), a wide area network (WAN), or any other appropriate architecture or system that facilitates communications in a network environment. Networks 14a-b can implement a TCP/IP communication language protocol in a particular embodiment of the present disclosure; however, networks 14a-b may alternatively implement any other suitable communication protocol for transmitting and receiving data packets within communication system 10. Network 14b resides between ITP signaling gateway 20 and SIGTRAN element 68, where SIGTRAN can be an SS7 peer or user adaptation protocol, where the transport is SCTP over IP.

The following description focuses on ITP signaling gateway 16, but its operations can readily be duplicated or otherwise mimicked by its peer ITP signaling gateways 18 and 20. As depicted by FIG. 1, ITP signaling gateway 16 may include processor 32, memory element 34, and ASP module 24. Note that ITP signaling gateway 16 can readily be part of a server in certain embodiments of this architecture. In one example implementation, ITP signaling gateway 16 is a network element that facilitates or otherwise helps coordinate flows for IP clients, as illustrated by FIG. 1. As used herein in this Specification, the term 'network element' is meant to encompass network appliances, servers, routers, switches, gateways, bridges, loadbalancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one example implementation, ITP signaling gateway 16 includes software (e.g., as part of ASP module 24) to achieve the deterministic routing operations, as outlined herein in this document. In other embodiments, this feature may be provided externally to these elements, or included in some other network device to achieve this intended functionality. Alternatively, several elements may include software (or reciprocating software) that can coordinate in order to achieve the operations, as outlined herein. In still other embodiments, any of the devices of FIG. 1 may include any suitable algorithms, hardware, software, components, modules, interfaces, or objects that facilitate these deterministic routing operations. Additional operational capabilities of communication system 10 are detailed below with respect to FIGS. 2-3.

Figure 2:
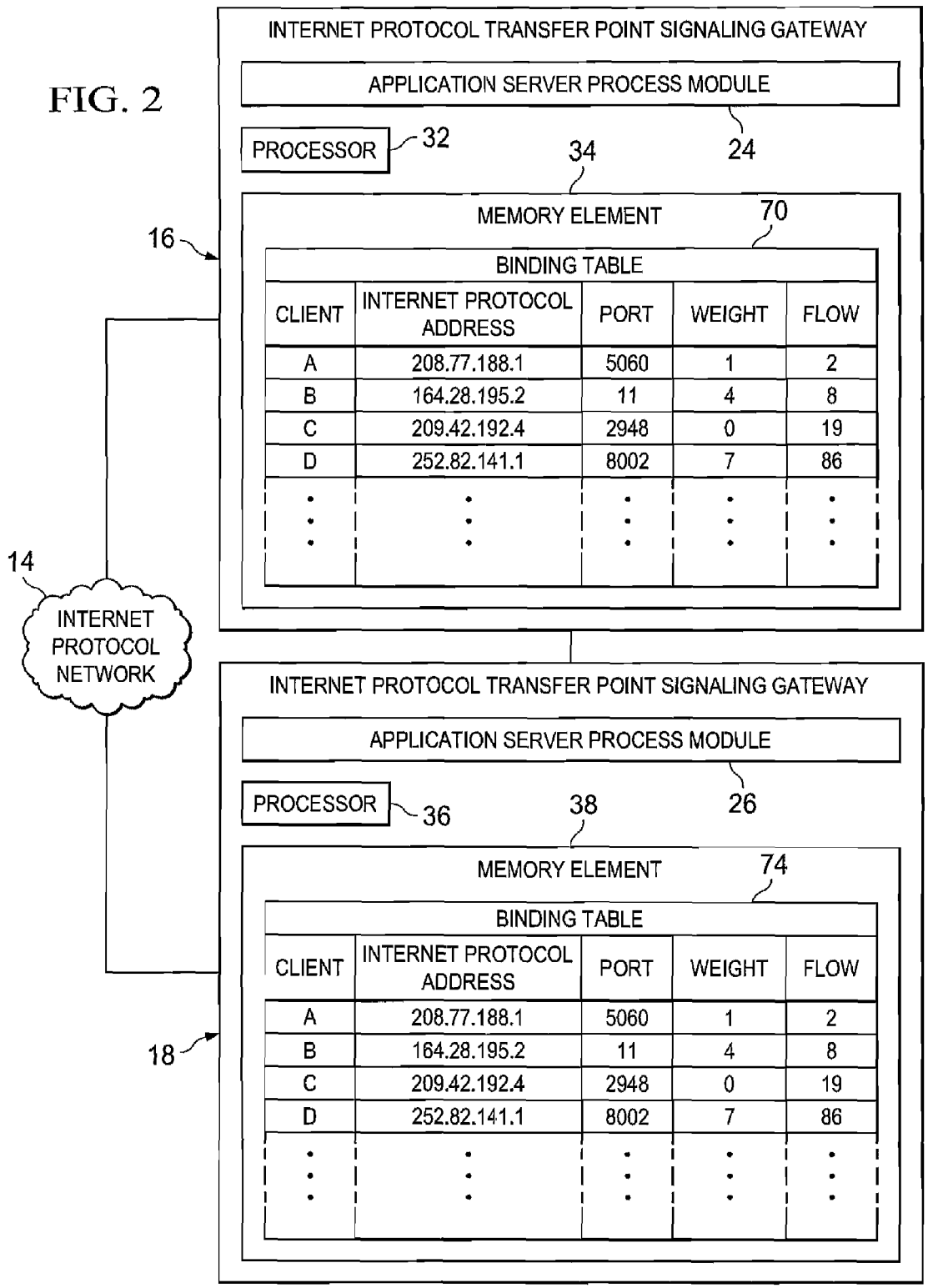
FIG. 2 is a simplified block diagram of an example component that may be used in the communication system in accordance with one embodiment.

Turning to FIG. 2, FIG. 2 is a simplified block diagram of ITP signaling gateway 16 (being coupled to its peer ITP signaling gateway 18) and this illustration offers a more detailed view related to one possible implementation. Memory element 34 is depicted as including a binding table 70, which includes a number of parameters within the table. Similarly, a binding table 74 is illustrated within memory element 38 and these two tables have matching entries. In this non-limiting example, binding table 70 includes a client (or endpoint) identifier, an IP address, a port number, a weight, and a flow number. More specifically, in regards to the port number, the port number (combined with an IP address) identifies the SCTP association peer (e.g., the ASP). Binding table 70 may be modified considerably without departing from the broad teachings of the present disclosure, as FIG. 2 represents simply one of many possible scenarios that can readily be used by communication system 10. Additional functionalities associated with binding table 70 are best understood in the context of several examples provided below.

In operation, communication system 10 can be configured to route inbound flows (coming from the ITP signaling gateways) to specific clients, where packets from the same flow consistently reach the same corresponding client. In an environment in which there is more than one server, ASP module 24 can establish a flow as belonging to a specific client. Communications about flow establishment are avoided over SGMP (or otherwise), to prevent high traffic loads associated with high numbers of unique flows (e.g., CIC values). Instead, ASP state, AS state, and rerouted payload traffic is exchanged between signaling gateways. This would allow the peer signaling gateways to understand that information associated with this flow should be routed to the same client. In one example implementation, a protocol (e.g., SGMP) can be leveraged in order to allow the ITP signaling gateways to communicate with each other. Such a protocol can exchange this information such that packets associated with a particular flow reach the same client.

It should be noted that the binding table can have a configured client or ASP that owns the binding when all ASPs are active; but it also has an active client or ASP that currently owns the binding based on the state of the network. The mapping, where the signaling gateways currently have an active association to the active ASP, could be included as part of ASP module 24.

In operation of one example configuration, ASP module 24 can offer a more deterministic approach to map a flow to a specific client. In one example, ITP signaling gateway 16 is preconfigured to know the range of clients for which it can provide effective mapping. In addition, ITP signaling gateway 16 may be aware of which clients are active, connected, or not connected. The peer signaling gateways can perform this mapping automatically. For example, if ITP signaling gateway 16 receives a flow (e.g., flow #8), it can map it to Client B. When new packets for flow #8 arrive at ITP signaling gateway 18, the packets can be automatically routed to Client B.

These activities can occur because each ITP signaling gateway can include a listing of clients, where the listing shares congruency with the listings of the peer signaling gateways. For example, the listing can include an IP address and a port number, where this entry is listed in the same order on each instance provided in a given ITP signaling gateway. Stated in different terms, it can be presumed that each gateway is working from the same listing of clients. SGMP can continue to be used to exchange information, but that information is not flow specific information and (in one example) it only relates to client availability information. For example, if Client B becomes inactive on one of the gateways, the other gateways would be informed of this event. This new information is important because it affects the distribution of flows. Therefore, the transport mechanism (e.g., SGMP) should be a reliable protocol to ensure database consistency. This is a prerequisite for a distributed implementation of the protocol.

Turning to a more detailed analysis related to the ASP binding's functionality, one objective of this mechanism is to eliminate the dynamic creation and maintenance of a unique data structure per ASP binding. This can reduce ITP central processing unit (CPU) load, SGMP management traffic, and supervisor (SUP) engine/line card updates in ITPs forwarding M3UA/SUA traffic with large CIC or SLS ranges. Instead, ASP bindings can be loadshared using a deterministic ranking of ASPs in the application server (AS) combined with the local and remote ASP state. In one example, the ASP state can be exchanged systematically between SGMP mates. In addition, ITP signaling gateway 16 can maintain local and remote ASP state. Also, the AS-based binding table can be maintained to loadshare groups of binding values (CIC or SLS) to active ASPs based on configured ASP weight. There is a mechanism to update the binding table when an ASP (locally or remotely) enters or exits active state. The updates may be performed algorithmically instead of reallocating an actual table.

One objective in such an approach is to minimize any disruption of existing flows when ASPs change state. Additionally, the mechanism can look up the destination ASP in the binding table when forwarding packets. In one instance, packets are forwarded to the most preferred active ASP, whether local or remote. The architecture can be configured to convert a time-controlled diversion from being binding-based to ASP-based. In some implementations, packets can be queued when a certain binding is diverted to a newly active ASP, but only packets associated with that binding value are queued. This feature provides that the packets to the newly active ASP are queued.

In terms of the binding table allocation, the binding table size can be proportional to the number of ASPs configured in the AS. Therefore, this can be allocated when exiting the AS configuration. In the case where it is already allocated, it is first freed and then reallocated. In one instance, the binding table is an array of ASP state structure pointers. The array size can be equal to the sum of the weights of the ASPs configured in the AS (totalAspWeight), where the default ASP weight could be 1. The binding table size can be (totalAspWeight×4) bytes in one example implementation.

In regards to the binding table update, there are certain objectives in routing packets to a loadshare-bindings network element (e.g., an application server). These can include load-sharing CIC/SLS values as evenly as possible across active ASPs in the AS, assuming incoming CIC/SLS values are evenly distributed. This can also include minimizing the redistribution of existing bindings when an ASP changes state. If a new ASP went active, only the pre-determined number of existing bindings should be redistributed to the new active ASP, but not to previously active ASPs. If an ASP went inactive, only its bindings should be affected. Additionally, the binding table should remain in sync between the SGMP ITPs. There may be small windows where ASPs change state in different orders on two ITPs. For example, a pair of ASPs may go active at the same time, each becoming active as seen by one ITP in a set of ITP signaling gateways. In this case, each ITP can see the local ASP state change before the remote change, but the final binding table state should be the same on both ITPs. This means that the binding table should be rebuilt for an ASP state change with no dependency on the current ASP state.

To optimize the routing path, the destination ASP in a loadshare-bindings application server can be selected from a binding table indexed by a value derived from the CIC or SLS value in the packet. The binding table includes ASPs that are locally active or inactive on the SGMP mates. It can be rebuilt at several times, for example, when an ASP becomes locally or remotely active when it was formerly inactive on mated ITP signaling gateways. It can also be rebuilt when an ASP becomes locally or remotely inactive, when it was already inactive on the SGMP mate. The binding table can be rebuilt (or otherwise modified) on the supervisor engine mechanism (e.g., SUP) and line cards at the same time. The mechanism can insert ASPs in proportion to their relative weight in the AS. Note that as used herein in this Specification, the term 'rebuild' and its permutations is meant to connote any type of generation of the associated binding table based on a deterministic approach to the construction. This generation may include guidance or direction being provided by ASP module 24, which can formulate the way in which the binding table is rebuilt.

For full routing loadshare bindings packets (when a destination ASP is selected in a loadshare bindings AS), the binding value (e.g. CIC, SLS) mod (totalAspWeight) yields a value between 0 and the totalAspWeight. This modValue can be used to index the binding table to find the destination ASP. The local ASP state can be checked and the packet forwarded to the ASP if it is locally active. If not, the packet can be sent to a mated ITP signaling gateway where the ASP is active.

In terms of a time control diversion during binding redistribution, when a new ASP becomes active in a loadshare bindings AS, existing bindings are diverted to it to maintain even load distribution. For a certain time interval, packets destined for this newly active ASP can be queued, and they can be sent when this timer expires. This can be done for several reasons. First, this can be done to ensure that packets for a specific CIC/SLS (already sent to the old ASP) arrive before subsequent packets with the same CIC/SLS are sent to the new ASP. Second, this can be done in the instance where an ASP state is uncertain (i.e., flapping). Additionally, such an approach can prevent constant binding redistribution by forcing the ASP to remain active for the timeout period before sending it traffic. The timer can be restarted if another redistribution occurs during the timeout period, and queued packets can be transferred to the new active ASP queue. When the timer expires, queued packets can be sent to the active ASP to ensure packets are not dropped.

For the actual ASP state update message, this update can be encoded (for example) as a standard M3UA ASP ACTIVE or ASP INACTIVE message. The routing context parameter can indicate the AS, and the information string parameter can contain the ASP name. This message can be sent when an ASP enters or exits active state (locally). It is also sent for all ASPs active in a loadshare-bindings application server, when the SGMP association is established. When received, the remote ASP state for the concerned ASP can be updated, an ASP state update message can be sent to line cards, and an ASP state checkpoint message can be sent to the standby SUP. Note that as used herein in this Specification, the term 'update message' is meant to include any data that is exchanged between peers in the network (e.g., the ITP signaling gateways).

In terms of memory impact, memory allocation for each ASP binding is not required on the SUP or line cards. Instead, the binding tables can be dynamically allocated and reallocated when exiting the AS configuration (on both the SUP and line cards). The memory savings introduced by these operations can be significant. Not only is memory usage reduced, it is much more static, as the usage can depend on the number of ASPs configured per AS.

FIG. 3 is a simplified flowchart illustrating one example operation associated with communication system 10. In this particular example, a call is sought to be established and a number of IP endpoints are active (and are ready to have their databases accessed). At step 100, upon system configuration of a set of mated Internet Protocol signaling gateways, a deterministic mapping of binding values to application server processes is done on each signaling gateway. The result of the call is a flow of SS7 messages being received by ITP signaling gateway 16, where inbound traffic is being sent by elements on the right-hand side of FIG. 1. This is illustrated by step 110. Typically, packets are received (in the form of a request), and ITP signaling gateway 16 may parse a packet in order to identify the relevant parameters that identify the flow, as shown by step 120. It should be noted that ITP signaling gateway 16 performs a number of additional functions pertaining to routing, traffic management, packet inspection, etc., where the flow of FIG. 3 is focused on the deterministic routing activities, as discussed herein. In this particular example, ITP signaling gateway 16 is configured to operate in a loadshare mode with bindings (in contrast to round robin protocols that are agnostic to bindings). In this scenario, all of the configured ASPs are available, including the ASP for which this flow was intended. A routing device (e.g., a router, a switch, a gateway, etc.) can route these packets to that designated ASP (i.e., the IP client) in step 130.

In cases where there is some volatility in the status of a given ASP in the group, the architecture can respond in several important ways. In this example, there are multiple ASPs involved (e.g., #1, #2, #3, etc.). When a flow arrives at ITP signaling gateway 16, the traffic is routed to ASP #1, as determined from the configured mapping of binding values to ASPs (in step 100). If the ASP is not active locally, then the traffic can be routed to an application server via a mated Internet Protocol transfer point, where the ASP is active.

Subsequently, ASP #1 fails on the signaling gateways. When this particular ASP #1 fails at step 140, then ITP signaling gateway 18 and ITP signaling gateway 20 may elect to route new packets (i.e., messaging) to different ASPs (ASP #2 or ASP #3). Now packets with the same binding value would be sent to two different ASPs, which is problematic for the overall flow.

It should be noted that there could be a unique ASP #1 state value for each peer signaling gateway. For example, given three signaling gateways, ASP #1 may be active on signaling gateway #1, inactive on signaling gateway #2 and active, but congested on signaling gateway #3. It is the exchange of this ASP state information per signaling gateway (e.g., over SGMP) that allows the deterministic feature to know when to reallocate binding values to a new ASP. For example, for this particular flow, if ASP #1 fails as seen by signaling gateway #1, the flows/bindings for ASP #1 are not generally reallocated unless ASP #1 has become inactive on signaling gateway #1, signaling gateway #2, and signaling gateway #3. Conversely, flows/bindings allocated to ASP #1 are restored when ASP #1 becomes active on any of the mated signaling gateways.

Instead of this scenario occurring, ASP module 24 can resolve these issues by providing a consistent viable pathway for its peer ITP signaling gateways. In this instance, ITP signaling gateway 16 designates ASP #2 as the proper destination for all subsequent packets to be routed for this particular flow, where its corresponding binding table is updated with this designation. This is illustrated by step 150. The weight selection, the weight parameters, availability characteristics, congestion status, etc. could be used in making this decision to route subsequent packets to ASP #2.

At step 160, this updated ASP state information (and/or information about bindings) can be propagated to peer ITP signaling gateways using any suitable transport (e.g., using a signaling gateway mate protocol). Those peer signaling gateways can update their respective binding tables to reflect the failure of ASP #1. In one example implementation, any event (an ASP becoming inactive, or becoming active, etc.) triggers a given ITP signaling gateway to rebuild their respective table to reflect this information. Each ITP signaling gateway should maintain the same state availability for associated clients via SGMP.

At step 170, ASP #1 recovers such that subsequent packets associated with a particular flow may now be routed back to this original ASP #1. ITP signaling gateway 16 is the first device to recognize this recovery, and this client availability information should be shared amongst ITP signaling gateways. At step 180, updated information about ASP state is sent from ITP signaling gateway 16 to both ITP signaling gateway 18 and ITP signaling gateway 20. Each of the peer signaling gateways can update their respective binding tables to reflect this recovering event of ASP #1. Note that this routing back to ASP #1 is the (a priori) configured deterministic home for this flow. In addition to these operations, a timer may be initiated in order to ensure that the flow is preserved and the sequence of the flow remains proper, as packets are routed back to ASP #1. The flow distribution should be the same as it was before the failure occurred. In one general sense, the mechanism is revertive in this scenario. This is reflected by step 190.

Note that there could be additional packet rerouting (e.g., using SGMP) in instances where a particular gateway is designated to receive all packets associated with a particular flow. In certain implementations, a packet received on ITP signaling gateway 16 that matches an ASP binding that is locally inactive, but active on another ITP signaling gateway, is rerouted to that gateway. Such rerouting takes place regardless of the state of any other ASPs in the application server; rerouting can be invoked even if the application server is locally active. This helps to maintain the binding state.

Software for providing deterministic routing can be provided at various locations. In one example implementation, this software is resident in a gateway, such as ITP signaling gateway 16, or another network element for which this capability is relegated. In other examples, this could involve combining ITP signaling gateway 16 with an application server, or some proprietary element, which could be provided in (or be proximate to) these identified gateways, or this could be provided in any other device being used by a given network in a call scenario.

In other embodiments, the deterministic routing feature may be provided externally to the gateways, or included in some other network device, or in a computer to achieve these intended functionalities. As identified previously, a gateway can include software to achieve the deterministic routing operations, as outlined herein in this document. In certain example implementations, the deterministic routing functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIGS. 1 and 2] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor [as shown in FIG. 1] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the gateways, the servers, etc.) can include memory elements for storing information to be used in achieving the deterministic routing operations as outlined herein. Additionally, each of these devices may include a processor that can execute software or an algorithm to perform the transitioning activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the examples provided herein, interaction may be described in terms of two, three, four, or more network elements. However, this has been done for purposes of clarity and example only. In certain cases, it may be easier to describe one or more of the functionalities of a given set of flows by only referencing a limited number of components or network elements. It should be appreciated that communication system 10 of FIG. 1 (and its teachings) are readily scalable. Communication system 10 can accommodate a large number of components, as well as more complicated or sophisticated arrangements and configurations. Accordingly, the examples provided should not limit the scope or inhibit the broad teachings of communication system 10 as potentially applied to a myriad of other architectures.

It is also important to note that the steps described with reference to the preceding FIGURES illustrate only some of the possible scenarios that may be executed by, or within, communication system 10. Some of these steps may be deleted or removed where appropriate, or these steps may be modified or changed considerably without departing from the scope of the discussed concepts. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the discussed concepts.

What is claimed is:

1. A method, comprising:
receiving a packet that is part of a flow;
identifying parameters within the packet for mapping the packet to a selected endpoint amongst a plurality of endpoints;
generating a first binding table that reflects the packet being associated with the selected endpoint;
identifying that the selected endpoint has changed state;
communicating an update message to a peer network element, the update message directing the peer network element to rebuild a peer binding table to reflect the changed state; and
recognizing that the selected endpoint has experienced a recovery such that an a priori routing selection is resumed for the flow, wherein the update message is provided in a signaling gateway mate protocol (SGMP), and wherein one of the parameters indicates an application server to which the packet is to be directed via a mated Internet Protocol transfer point.

2. The method of claim 1, wherein the binding tables include matching entries that associate the selected endpoint and the flow.

3. The method of claim 1, wherein one of the parameters is a Signaling System Number 7 (SS7) parameter within the packet, and wherein the association of the packet to the selected endpoint is an application server process (ASP) binding provided in the first binding table.

4. The method of claim 1, wherein the first binding table includes an assigned weight for the selected endpoint.

5. The method of claim 1, wherein the first binding table includes an Internet Protocol (IP) address associated with each of the endpoints, a port number, and a flow number assigned to the flow.

6. The method of claim 1, further comprising:
routing additional packets associated with the flow based on mapping the packet to the selected endpoint.

7. Logic encoded in non-transitory media that includes code for execution and when executed by a processor is operable to perform operations comprising:
receiving a packet that is part of a flow;
identifying parameters within the packet for mapping the packet to a selected endpoint amongst a plurality of endpoints;
generating a first binding table that reflects the packet being associated with the selected endpoint;
identifying that the selected endpoint has changed state;
communicating an update message to a peer network element, the update message directing the peer network element to rebuild a peer binding table to reflect the changed state; and
recognizing that the selected endpoint has experienced a recovery such that an a priori routing selection is resumed for the flow, wherein the update message is provided in a signaling gateway mate protocol (SGMP), and wherein one of the parameters indicates an application server to which the packet is to be directed via a mated Internet Protocol transfer point.

8. The logic of claim 7, wherein the binding tables include matching entries that associate the selected endpoint and the flow.

9. The logic of claim 7, wherein one of the parameters is a Signaling System Number 7 (SS7) parameter within the packet, and wherein the association of the packet to the selected endpoint is an application server process (ASP) binding provided in the first binding table.

10. The logic of claim 7, wherein the first binding table includes an assigned weight for the selected endpoint.

11. The logic of claim 7, wherein the first binding table includes an Internet Protocol (IP) address associated with each of the endpoints, a port number, and a flow number assigned to the flow.

12. The logic of claim 7, the processor being further operable to perform operations comprising:
routing additional packets associated with the flow based on mapping the packet to the selected endpoint.

13. An apparatus, comprising:
a memory element configured to store data;
a processor operable to execute instructions associated with the data; and
an application server process (ASP) module configured to interface with the memory element and the processor, the ASP module being configured to:
receive a packet that is part of a flow;
identify parameters within the packet for mapping the packet to a selected endpoint amongst a plurality of endpoints;
generate a first binding table that reflects the packet being associated with the selected endpoint;
identify that the selected endpoint has changed state;
communicate an update message to a peer network element, the update message directing the peer network element to rebuild a peer binding table to reflect the changed state; and
recognize that the selected endpoint has experienced a recovery such that an a priori routing selection is resumed for the flow, wherein the update message is provided in a signaling gateway mate protocol (SGMP), and wherein one of the parameters indicates an application server to which the packet is to be directed via a mated Internet Protocol transfer point.

14. The apparatus of claim 13, wherein the binding tables include matching entries that associate the selected endpoint and the flow.

15. The apparatus of claim 13, wherein one of the parameters is a Signaling System Number 7 (SS7) parameter within the packet, and wherein the association of the packet to the selected endpoint is an application server process (ASP) binding provided in the first binding table, which is included in the memory element.

16. The apparatus of claim 13, wherein the first binding table includes an assigned weight for the selected endpoint, an Internet Protocol (IP) address associated with each of the endpoints, a port number, and a flow number assigned to the flow.

17. The apparatus of claim 13, wherein the ASP module is further configured to:
 route additional packets associated with the flow based on mapping the packet to the selected endpoint.

\* \* \* \* \*